US011874592B2

United States Patent
Nakamura et al.

(10) Patent No.: US 11,874,592 B2
(45) Date of Patent: Jan. 16, 2024

(54) LIGHT SOURCE DEVICE AND IMAGE PROJECTION APPARATUS

(71) Applicants: Kasumi Nakamura, Kanagawa (JP); Yohei Takano, Kanagawa (JP); Kazuhiro Fujita, Tokyo (JP); Takashi Sasaki, Kanagawa (JP); Shigeaki Imai, Kanagawa (JP); Makoto Hirakawa, Tokyo (JP)

(72) Inventors: Kasumi Nakamura, Kanagawa (JP); Yohei Takano, Kanagawa (JP); Kazuhiro Fujita, Tokyo (JP); Takashi Sasaki, Kanagawa (JP); Shigeaki Imai, Kanagawa (JP); Makoto Hirakawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 11 days.

(21) Appl. No.: 17/692,208

(22) Filed: Mar. 11, 2022

(65) Prior Publication Data
US 2022/0299852 A1    Sep. 22, 2022

(30) Foreign Application Priority Data
Mar. 17, 2021    (JP) ................. 2021-043237

(51) Int. Cl.
*G03B 21/20*    (2006.01)
*G02B 26/00*    (2006.01)

(52) U.S. Cl.
CPC ......... *G03B 21/204* (2013.01); *G02B 26/008* (2013.01); *G03B 21/208* (2013.01); *G03B 21/2013* (2013.01); *G03B 21/2066* (2013.01)

(58) Field of Classification Search
CPC .............. G03B 21/204; G03B 21/2013; G03B 21/2066; G03B 21/208; G02B 26/008; G02B 27/1006; G02B 27/141
See application file for complete search history.

(56) References Cited

U.S. PATENT DOCUMENTS

| 2014/0036241 A1 | 2/2014 | Takehiro et al. |
| 2014/0049755 A1 | 2/2014 | Nishimori et al. |

(Continued)

FOREIGN PATENT DOCUMENTS

| CN | 102854733 A | 1/2013 |
| CN | 103913936 A | 7/2014 |

(Continued)

OTHER PUBLICATIONS

U.S. Appl. No. 17/462,109, filed Aug. 31, 2021, Yohei Takano, et al.
(Continued)

*Primary Examiner* — Magda Cruz
(74) *Attorney, Agent, or Firm* — XSENSUS LLP

(57) ABSTRACT

A light source device includes: a first light source to emit first color light; a second light source to emit second color light; a wavelength conversion unit to convert at least a portion of the first color light into a third color light; a light incident element to which the first color light, the second color light, and the third color light enter; a first filter to reflect the first color light toward the wavelength conversion unit; and a second filter to reflect the second color light toward the light incident element. The first filter and the second filter are separately disposed on an optical path of the third color light between the wavelength conversion unit and the light incident element.

14 Claims, 14 Drawing Sheets

(56) References Cited

U.S. PATENT DOCUMENTS

| | | |
|---|---|---|
| 2014/0071182 A1 | 3/2014 | Takahashi et al. |
| 2014/0071407 A1 | 3/2014 | Takahashi et al. |
| 2014/0240679 A1 | 8/2014 | Nishimori et al. |
| 2014/0240680 A1 | 8/2014 | Nishimori et al. |
| 2014/0268069 A1 | 9/2014 | Takahashi et al. |
| 2014/0285772 A1* | 9/2014 | Tajiri .................... F21V 9/30 353/31 |
| 2015/0042963 A1 | 2/2015 | Nishimori et al. |
| 2015/0131062 A1 | 5/2015 | Nishimori et al. |
| 2015/0146174 A1* | 5/2015 | Ferri .................. G03B 21/204 353/31 |
| 2015/0253653 A1 | 9/2015 | Fujita et al. |
| 2015/0316840 A1 | 11/2015 | Maeda et al. |
| 2016/0103387 A1 | 4/2016 | Nishimori et al. |
| 2016/0109221 A1 | 4/2016 | Takahashi et al. |
| 2016/0223892 A1 | 8/2016 | Takahashi et al. |
| 2016/0349606 A1 | 12/2016 | Nishimori et al. |
| 2016/0377969 A1 | 12/2016 | Nishimori et al. |
| 2017/0299953 A1 | 10/2017 | Maeda et al. |
| 2018/0299757 A1* | 10/2018 | Liao .................. G03B 21/204 |
| 2019/0129288 A1 | 5/2019 | Maeda et al. |
| 2019/0304402 A1 | 10/2019 | Suzuki et al. |
| 2020/0064719 A1 | 2/2020 | Nakamura et al. |
| 2020/0103734 A1* | 4/2020 | Sugiyama ............ G03B 33/12 |
| 2020/0201158 A1 | 6/2020 | Maeda et al. |
| 2020/0301260 A1 | 9/2020 | Takano et al. |
| 2020/0301266 A1 | 9/2020 | Nakamura et al. |
| 2021/0116707 A1 | 4/2021 | Hirakawa et al. |
| 2021/0136336 A1 | 5/2021 | Takano et al. |
| 2021/0141297 A1* | 5/2021 | Pan .................... G03B 21/2066 |
| 2021/0200075 A1 | 7/2021 | Nakamura et al. |

FOREIGN PATENT DOCUMENTS

| | | | |
|---|---|---|---|
| CN | 103913937 A | 7/2014 | |
| CN | 206863465 U | 1/2018 | |
| CN | 208283710 U | 12/2018 | |
| CN | 111708247 A | 9/2020 | |
| EP | 2889685 A1 * | 7/2015 | ............... G02F 2/02 |
| JP | 2014-186115 | 10/2014 | |
| JP | 2020-154024 | 9/2020 | |
| JP | 2020-160434 A | 10/2020 | |

OTHER PUBLICATIONS

U.S. Appl. No. 17/509,106, filed Oct. 25, 2021, Yohei Takano, et al.
U.S. Appl. No. 17/533,119, filed Nov. 23, 2021, Makoto Hirakawa, et al.
Office Action dated Jun. 29, 2023 in Chinese Patent Application No. 202210261144.7, 9 pages.

* cited by examiner

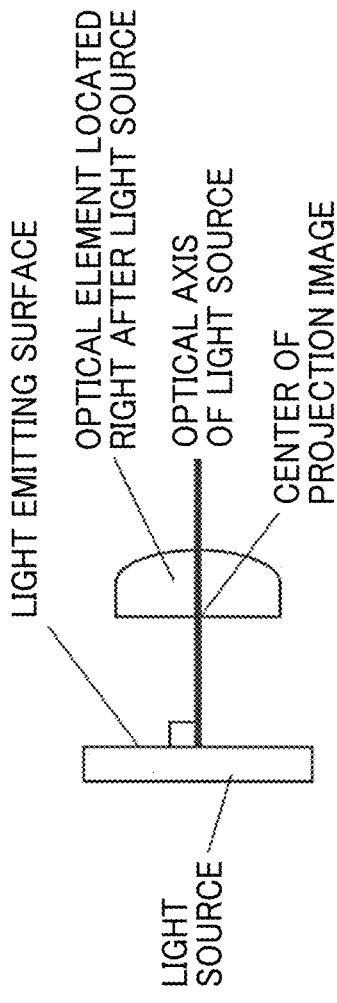
FIG. 1A
FIG. 1B
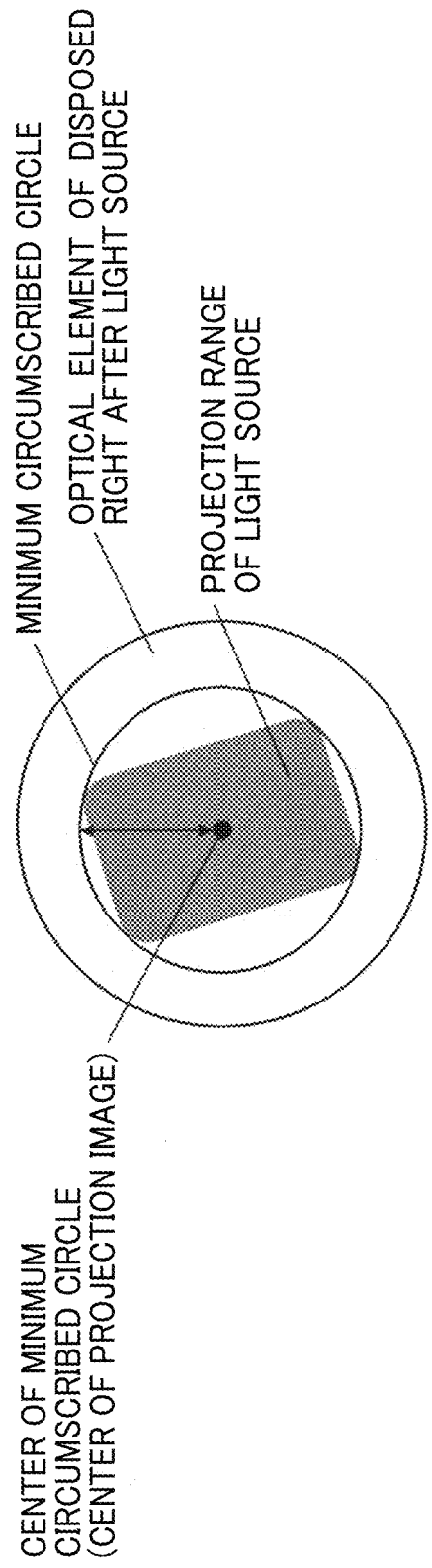
FIG. 1C

LIGHT SOURCE DEVICE AND IMAGE PROJECTION APPARATUS

CROSS-REFERENCE TO RELATED APPLICATIONS

This patent application is based on and claims priority pursuant to 35 U.S.C. § 119(a) to Japanese Patent Application No. 2021-043237, filed on Mar. 17, 2021, in the Japan Patent Office, the entire disclosure of which is hereby incorporated by reference herein.

BACKGROUND

Technical Field

Embodiments of this disclosure relate to a light source device and an image projection apparatus.

Related Art

Projectors (image projection apparatuses) that magnify and project various images on to a screen are widely used. In projectors, light emitted by a light source is condensed on a spatial light modulator or an image display such as a digital micromirror device (DMD) or a liquid crystal display element through an illumination optical system, and the light condensed on the spatial light modulator is modulated according to an image signal to generate modulated light, and the modulated light is displayed on a screen through a projection optical system as a color image.

SUMMARY

A light source device includes: a first light source to emit first color light; a second light source to emit second color light; a wavelength conversion unit to convert at least a portion of the first color light into a third color light; a light incident element to which the first color light, the second color light, and the third color light enter; a first filter to reflect the first color light toward the wavelength conversion unit; and a second filter to reflect the second color light toward the light incident element. The first filter and the second filter are separately disposed on an optical path of the third color light between the wavelength conversion unit and the light incident element.

An image projection apparatus includes: the light source device; an illumination optical system to guide light emitted from the light source device to an image display; the image display to generate an image with the light guided by the illumination optical, system; and a projection optical system to project the image generated by the image display.

BRIEF DESCRIPTION OF THE DRAWINGS

A more complete appreciation of the disclosure and many of the attendant advantages and features thereof can be readily obtained and understood from the following detailed description with reference to the accompanying drawings, wherein;

FIG. 1A is an illustration of an optical axis of a lens;

FIG. 1B is an illustration of an optical axis of a light source and an optical element;

FIG. 1C is an illustration of the center of a projection image;

Figure 2:
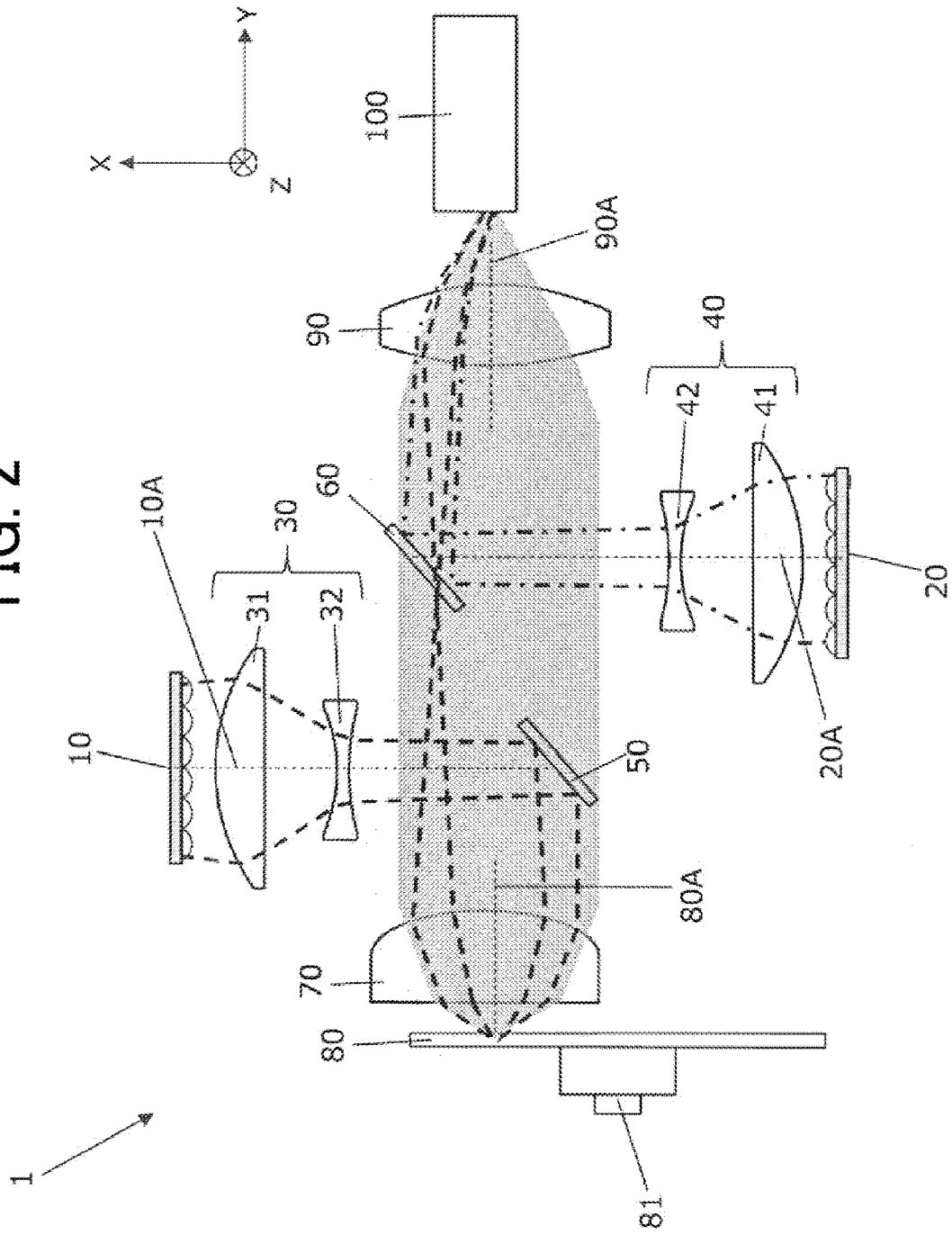
FIG. 2 is an illustration of a configuration of a light source device according to a first embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a" "an," and "the" are intended to include the plural forms as well, unless the context clearly indicates otherwise.

Embodiments of the present disclosure provide a light source device and an image projection apparatus that include multiple light sources and achieve downsizing.

A projector irradiates an image display element such as a DMD with light of three colors, for example, red, green, and blue which are three primary colors to form an image. Although these three colors can be generated by laser light sources, since luminous efficacy of a red laser and a green laser is lower than that of a blue laser, a method of irradiating a phosphor with a blue laser as excitation light and generating red light and green light from fluorescent light wavelength-converted by the phosphor is generally used.

However, since a spectral width of fluorescent light is broader, color reproducibility by the fluorescent light is poor compared to a case of using a laser light source. Recently, a technique that combines red laser light and green laser light with fluorescent light is used to achieve both higher brightness and a better color reproducibility by reinforcing a red component of the fluorescent light with red laser light and a green component with green laser light.

When at least one of the red laser light and the green laser light is combined with the fluorescent light, the spectra of at least one of the red laser light and the green laser light overlap the spectrum of the fluorescent light, and the fluorescent light is partially cut. As a result, a light use efficiency of the fluorescent light is decreased. In addition, a size of a light source device or a projector increases due to addition of multiple laser light sources for at least one of red color or green color and a limitation of an arrangement of multiple laser light sources.

FIG. 1A is an illustration of an optical axis of a lens. The lens has a rotational symmetry, and a rotational axis passes through a center of the lens. In FIG. 1A, the optical axis is a virtual straight line passing through the lens and coincides with the rotational axis of the lens. The optical axis may also be the center axis of the lens.

FIG. 1B is an illustration of an optical axis of a light source and an optical element. As illustrated in FIG. 1B, the optical axis of the light source is a straight line vertically coupling a light emitting surface of the light source with a center of a projection image on the optical element disposed right after the light sources along the optical axis of the light source. The optical axis may also be a center axis of the light source.

In addition to the optical axis in FIG. 1A and FIG. 1B, hereinafter, the "optical axis" refers to a virtual line including a virtual light beam representing rays passing through an entire optical system in a certain optical system. Depending on the design of the optical system, in a case of an optical system including: multiple optical elements, an optical axis may be disposed on a virtual line that substantially coincides with an axis of a rotational symmetry of each optical element. In a single optical element, for example, a straight line connecting the center of curvature of a front surface with the center of curvature of a rear surface of the single optical element may coincide with an optical axis. When at least one of a front surface or a rear surface of the single optical element is flat a plano-convex lens or a plano-concave lens), a straight line passing through a center of curvature of at least one of the front surface or the rear surface may coincide with the optical axis. In a case of an optical system in which multiple optical elements are arranged, a virtual line substantially connecting a center of curvature of a curved surface of each optical element may coincide with the optical axis. Actually, light (i.e., a light beam) may not pass exactly through the optical axis, is an illustration of the center of a projection image. In FIG. 1C, the center of the projection image is defined by a center of a minimum circumscribed circle of an intensity distribution of the projection image from the light source, in which the projection image is projected onto the optical element disposed right after the light source.

Hereinafter, first color light is first light having a first wavelength band, second color-light is second light having a second wavelength band, and a third color light is third light having a third wavelength band. In other words, each of the first color light, the second color light, and third color light has a different wavelength band. The first wavelength band, the second wavelength band, and the third wavelength band are different wavelength bands; however, some parts of the wavelength bands may overlap. For example, the first color light may be blue light, the second color light may be red light or green light, and the third color light may be yellow fluorescent light or green fluorescent light. By setting the second color light as red light or green light and by setting the third color light as yellow fluorescent light or green fluorescent light, a red component or a green component of the fluorescent light is enhanced by another red light or another green light, so that color reproducibility of the light source device is improved.

First Embodiment

FIG. 2 is an illustration of a configuration of a light source device according to a first embodiment. Hereinafter, an X-axis, a Y-axis, and a Z-axis are based on arrows illustrated in the drawings. A positive (+) side of each axis is indicated by an arrow, and the opposite is a negative (−) side (a +X-direction, a +Y-direction, and a +Z-direction are indicated by arrows in FIG. 2, and a −X-direction, a −Y-direction, and a −Z-direction are respectively opposite thereto. Hereinafter the ±X-directions, ±Y-directions, and ±Z-directions are referred to simply as an X-axis, a Y-axis, and a Z-axis as appropriate). The X-axis, the Y-axis, and the Z-axis are orthogonal to each other in a three-dimensional space (i.e., the Cartesian coordinate system or the rectangular coordinate system).

The light source device 1 includes a blue laser light source 10 (i.e., first light source), a red laser light source 20 second light source), a blue laser reduction element 30, a red laser reduction element 40, a first filter 50 (i.e., first optical element) such as a dichroic mirror or a notch filter, a second filter 60 (i.e., second optical element) such as a dichroic mirror or a notch filter, a first condensing lens 70 (i.e., first light condensing element or light condensing optical system), a wavelength conversion unit 80 (i.e., phosphor unit), a second condensing lens 90 (i.e., second light condensing element or condensing optical system), and a light homogenizing element 100 (i.e., light incident element).

The positions of the blue laser light source 10, the red laser light source 20, the blue laser reduction element 30, the red laser reduction element 40, the first filter 50, the second filter 60, the first condensing lens 70, the wavelength conversion unit 80, the second condensing lens 90, and the light homogenizing element 100 coincide with each other in the Z-axis and are at least partially arranged in the same plane including the X-axis and the Y-axis.

The blue laser light source 10, the blue laser reduction element 30, and the first filter 50 are arranged in this order in the −X-direction at the negative side (at a position close to the first condensing lens 70) in the Y-axis. The red laser light source 20, the red laser reduction element 40, and the second filter 61) are arranged in that order in the +X-direction at the positive side (at a position close to the second condensing lens 90) in the Y-axis.

The positions of the first condensing lens 70, the wavelength conversion unit 80, the second condensing lens 90, and the light homogenizing element 100 coincide with each other and are arranged in the Y-axis. Specifically, the first condensing lens 70 and the wavelength conversion unit 80 are arranged in this order in the −Y-direction at the negative side of the first filter 50 along the Y-axis. The second condensing lens 90 and the light homogenizing element 100 are arranged in this order in the +Y-direction and at the positive side of the second filter 60.

The blue laser light source 10 emits blue laser light (i.e., blue light or first color light) toward the negative side in the X-axis. The blue laser light has, for example, a center wavelength of 455 nm, but is not limited thereto. The blue laser light may have any wavelength as long as the blue laser light excites the fluorescence region 54 of the wavelength conversion unit 80. In FIG. 2, the blue laser light source 10 is illustrated as multiple light sources arranged in an array, but is not limited thereto. The blue laser light source 10 may be a single light source. In FIG. 2, a beam of the blue laser light (i.e., blue laser beam) is depicted by a bold broken line, and the optical axis 10A of the blue laser beam are indicated by a dotted line.

The blue laser reduction element 30 includes a positive lens 31 and a negative lens 32. The positive lens 31 converges the blue laser light from the blue laser light source 10, and the negative lens 32 diverges the blue laser light from the blue laser light source 10. As a result, the blue laser light from the blue laser light source 10 is substantially collimated. Preferably, the blue laser reduction element. 30 is designed or adjusted so that the size of the blue laser beam is suitable for the size of the first filter 50.

The first filter 50 reflects the blue laser light substantially collimated by the blue laser reduction element 30 in the −Y-direction and guides the blue laser light to the wavelength conversion unit 80 through the first condensing lens 70. The first filter 50 has, for example, a property of reflecting only the blue light and transmitting the fluorescent light. The red laser light source 20 emits a red laser light (i.e., red light or second color light) in the +X-direction. The red laser light has, for example, a center wavelength of 610 nm but is not limited thereto. The red laser light may have any wavelength as long as the red laser light achieves a desired color reproducibility. In FIG. 2, the red laser light source 20 is illustrated as multiple light emitting sources arranged in an array, but is not limited thereto. The red laser light source 20 may be a single light emitting source. In FIG. 1, a beam of the red laser light (i.e., red laser beam) is depicted by a bold dashed-dotted line, and the optical axis 20A of the red laser beam are indicated by a dotted line. In the present embodiment, the red laser light from the red laser light source 20 is combined with the fluorescent light as an example. However, in some embodiments, green laser light or laser light having other wavelength bands (i.e., other colors) may be combined with the fluorescent light. In such a case, preferably the properties of the second filter 60 may be changed in accordance with the wavelength or the light source used in the light source device.

The red laser reduction element 40 includes a positive lens 41 and a negative lens 42. The positive lens 41 converges the red laser light from the red laser light source 20, and the negative lens 42 diverges the red laser light from the red laser light source 20. As a result, the red laser light from the red laser light source 20 is substantially collimated. Preferably, the red laser reduction element 40 is designed or adjusted so that a size of a red laser beam is suitable for a size of the second filter 60.

The second filter 60 has a property of reflecting red light, reflects the red laser light substantially collimated by the red laser reduction element 40 to the positive side in the Y-axis, and guides the red laser light to the light homogenizing element 100 through the second condensing lens 90.

The first condensing lens 70 condenses the blue laser light from the first filter 50 and guides the blue laser light to the wavelength conversion unit 80. The first condensing lens 70 also substantially collimates the blue laser light and the fluorescent light (i.e., third color light) from the wavelength conversion unit 80 and guides the blue laser light and the fluorescent beam to the positive side in the Y-axis. Herein, "substantially collimates" is achieved within a tolerance in manufacturing of an element, a device, and an apparatus.

The first condensing lens 70 is disposed between the first filter 50 and the wavelength conversion unit 80 and works as a "first light condensing element" that condenses the blue laser light reflected by the first filter 50 and substantially collimates the blue laser light and the fluorescent light emitted from the wavelength conversion unit 80. The blue laser light enters the wavelength conversion unit 80 through a part of the first condensing lens 70 (i.e., region on the positive side in the X-axis). The blue laser light is reflected by, a reflection region 83 of the wavelength conversion unit 80 (FIG. 3) and emitted through the other part of the first condensing lens 70 (i.e., region on the negative side in the X-axis). Thus, since the blue laser light to excite the phosphor is used as light, white light is generated together with the fluorescent light.

The wavelength conversion unit 80 directly reflects the blue laser light from the first condensing lens 70 and guides the blue laser light to the first condensing lens 70. The wavelength conversion unit 80 also converts the blue laser light from the first condensing lens 70 into fluorescent light (i.e., third color light) and guides the fluorescent light to the first condensing lens 70. The wavelength conversion unit 80 converts at least a portion of the blue laser light emitted from the first condensing lens 70 into fluorescent light and emits the fluorescent light.

Figure 3:
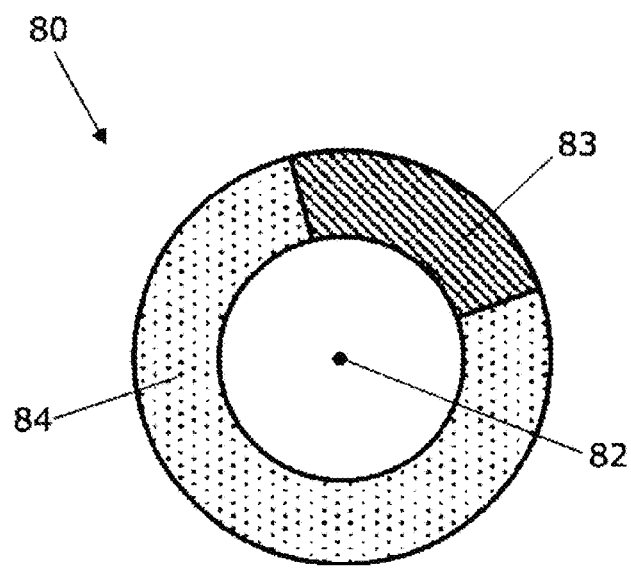
FIG. 3 is an illustration of a wavelength conversion unit in the light source device in FIG. 2.

FIG. 3 is an illustration of a wavelength conversion unit 80 as an example. The wavelength conversion unit 80 includes a disk member that is rotatable about a rotation axis 82 (FIG. 3) and a driving unit 81 (FIG. 2) including a motor unit. The rotation axis 82 (FIG. 3) is along the Y-axis (FIG. 2). The disk member of the wavelength conversion unit 80 is divided into a reflection region 83 and a fluorescence region 84 in the circumferential direction of the disk member, in FIG. 3, the reflection region 83 is depicted as a smaller region, and the fluorescence region 84 is depicted as a lager region. As the disk member of the wavelength conversion unit 80 rotates around the rotation axis 82, the blue laser light alternately hits the reflection region 83 and the fluorescence region 84 time-division manner). The blue laser light that hits the reflection region 83 is reflected by the reflection region 83 and guided to the first condensing lens 70. The blue laser light that hits the fluorescent region 84 works as excitation light in the fluorescent region 84 and is converted into fluorescent light (i.e., third color light) having, a wavelength band different from that of the blue laser light. The fluorescent light is guided to the first condensing lens 70. As described above, the wavelength conversion unit 80 alternately switches between a function of reflecting the blue laser light and guiding the blue laser light to the first condensing lens 70 and a function of converting the blue laser light into the fluorescent light and guiding the fluorescent light to the first condensing lens 70.

The disk member of the wavelength conversion unit 80 is divided into the reflection region 83 and the fluorescence region 84 in FIG. 3 (i.e., two divided regions), but is not limited to the two divided regions. The disk member of the wavelength conversion unit 80 may be divided into two or more fluorescence regions, such as a yellow fluorescence region or a green fluorescence region. The wavelength conversion unit 80 is not limited to a unit that is rotationally driven and emits light in the time-division manner, and may be any unit that has a function of reflecting blue laser light and a function of converting fluorescent light.

In FIG. 2, a beam of the fluorescent light is shaded, and the optical axis 80A of the fluorescent light is indicated by a dotted line. As illustrated in FIG. 2, the light beam of the blue laser light depicted by bold broken lines and the light beam of the red laser light depicted by bold dashed-dotted lines are included in in the shaded range of the fluorescent light (a shaded light beam).

The second condensing lens 90 condenses the red laser light (i.e., second color light) entered from the second filter 60 and the blue laser light (i.e., first color light) and the fluorescent beam (i.e., third color light) entered from die wavelength conversion unit 80 and the first condensing lens 70, and guides the first to third color light to the light homogenizing element 100. In FIG. 2, the optical axis 90A of the second condensing lens 90 is indicated by a dotted line.

The light homogenizing element 100 is, for example, a light tunnel enclosed by four mirror plates with their mirrors facing inside, which is a hollow tunnel having a quadrangular-prism shape. The light homogenizing element 100 homogenizes and emits the blue laser light (i.e., first color beam), the red laser light (i.e., second color light), and the fluorescent light (i.e., third color light) entered from the second condensing lens 90.

Optical paths of the blue laser light (i.e., first color light), the red laser light second color light), and the fluorescent light (i.e., third color light) are described.

The blue laser light is emitted from the blue laser light source 10 and collimated by the blue laser reduction element 30, thus to be shaped into substantially parallel light. The blue laser light is reflected by the first filter 50. The blue laser light enters a half part of the first condensing lens 70 at the negative side in the X-axis, approaches the optical axis at an angle due to the refractive power of the first condensing lens 70, is condensed near the optical axis of the first condensing lens 70, and enters the wavelength conversion unit 80. The blue laser light is reflected by the reflection region 83 of the wavelength conversion unit 80, enters the half part of the first condensing lens 70 at the positive side in the X-axis, separates from the optical axis at an angle due to the refractive power of the first condensing lens 70, and becomes substantially parallel light. The blue laser light enters a half part of the second condensing lens 90 at the positive side in the X-axis, approaches the optical axis at an angle due to the refractive power of the second condensing lens 90, is condensed near the optical axis, and enters the light homogenizing element 100 disposed near a condensing position.

The red laser light, is emitted from the red laser light source 20 and collimated by the red laser reduction element 40 to be shaped substantially parallel light. The red laser light is reflected by the second filter 60. The red laser light enters a half part of the second condensing lens 90 on the positive side in the X-axis, approaches the optical axis at an angle due to the refractive power of the second condensing lens 90, is condensed near the optical axis, and enters the light homogenizing element 100 disposed near the condensing position.

The fluorescent light is generated by exciting the fluorescent region 84 of the wavelength conversion unit 80 with the blue laser light. The fluorescent light is substantially collimated by the first condensing ions 70. A portion of the fluorescent light at the negative side in the X-axis passes through the first filter 50, is condensed by the second condensing lens 90, and enters the light homogenizing element 100 disposed near the condensing position. A portion of the fluorescent light at the positive side in the X-axis passes through the second filter 60, is condensed by the second condensing lens 90, and enters the light homogenizing element 100 disposed near the condensing position. The second filter partially reflects the portion of the fluorescent light.

In the light source device 1 of the present embodiment, the first filter 50 and the second filter 60 are separately disposed on the optical path of the fluorescent light (i.e., third color light) between the wavelength conversion unit 80 and the light homogenizing element 100. As a result, a latitude of the configuration of the blue laser light source 10, the red laser light source 20, the first filter 50, and the second filter 60 is increased, and the size of the light source device 1 is reduced. In addition, a latitude of the configuration of the first filter 50 and the second filter 60 is increased, and a light loss due to the first filter 50 and the second filter 60 in the optical path of the fluorescent light (i.e., third color light) is minimized. As a result, the light use efficiency is increased.

When positions of the blue laser light source 10, the blue laser reduction element 30, the first filter 50 and positions of the red laser light source 20, the red laser reduction element 40, and the second filter 60 coincide each other in the Z-axis, are shifted in the Y-axis, and are overlapped in the X-axis, the size of the light source device 1 is further reduced.

The first condensing lens 70 and the second condensing lens 90 form a "condensing optical system" disposed between the wavelength conversion unit 80 and the light homogenizing element 100. The first filter 50 and the second filter 60 are disposed outside the optical axis of the condensing optical system. Especially, the second filter 60 is disposed out of the optical axis of the second condensing lens 90 (i.e., condensing optical system). Since the fluorescent light (i.e., third color light) has a higher intensity near the optical axis of the condensing optical system, the light use efficiency of the fluorescent light is improved by disposing the first filter 50 and the second filter 60 (in particular, the second filter 60) so as to avoid aligning the optical axis of the second condensing lens 90 (i.e., the condensing optical system).

The optical axis 10A (i.e., central axis) of the blue laser light. (i.e., first color light) emitted from the blue laser light source 10 (i.e., first light source) and the optical axis 20A (i.e., central axis) of the red laser light (i.e., second color light) emitted from the red laser light source 20 (i.e., second light source) are different from each other. The optical axis 10A (i.e., central axis) and the optical axis 20A are arranged in the same plane including the X-axis and the Y-axis and parallel to each other in the X-axis in the optical path of the fluorescent light (i.e., third color light) between the wavelength conversion unit 80 and the light homogenizing element 100. By arranging the blue laser light source 10, the red laser light source 20, and a cooling device (e.g., heat sink) of each laser light source in parallel so as to be shifted away from each other along the Y-axis, the light source device 1 is prevented front increasing in size in the X-axis. In addition, cooling efficiency of the laser light source by the cooling device is increased.

The first filter 50 and the second filter 60 are arranged to prevent any portion of the third color light from passing through both the first filter 50 and the second filter 60. As a result, a decrease in the light use efficiency of a part of the fluorescent light is prevented, and color unevenness of the fluorescent light is reduced.

The second filter 60 transmits the wavelength band of the fluorescent light (i.e., third color light) excluding the wavelength band of the red laser light (i.e., second color light). In other words, the second filter reflects only the red component. In such a way, by providing the second filter 60 with wavelength selectivity that provides a narrow-band reflection spectrum, the light use efficiency of fluorescent light is improved.

Figure 4:
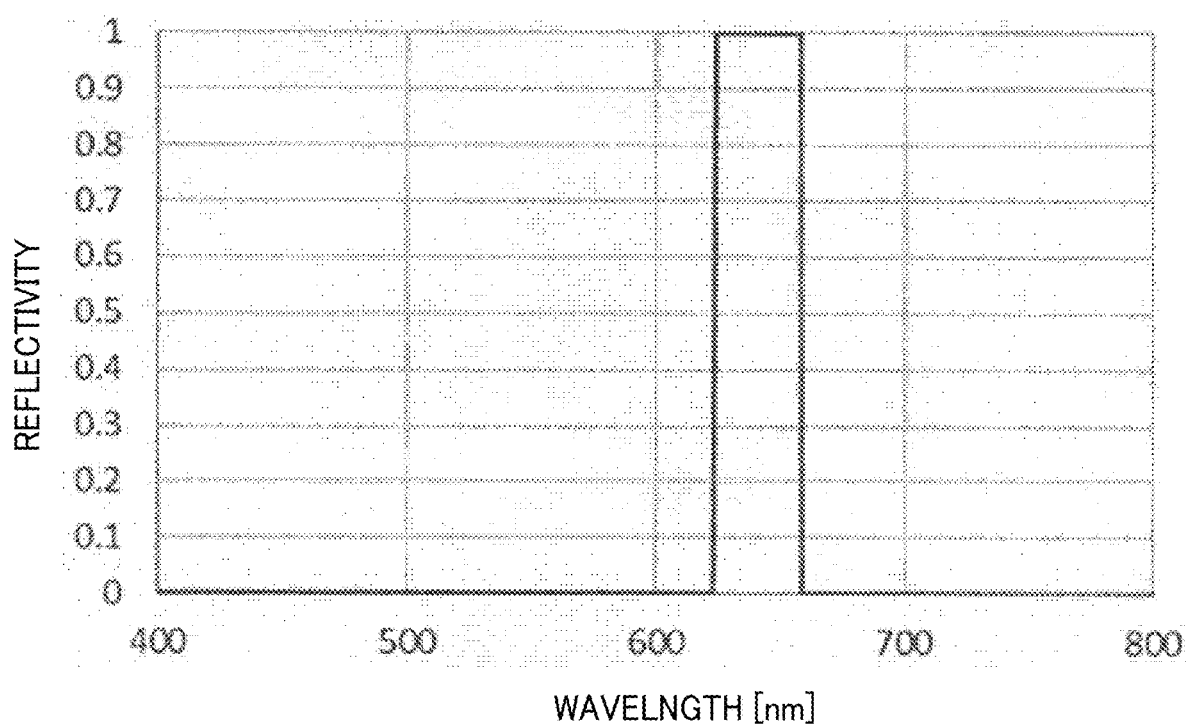
FIG. 4 is a graph of a reflection property of a second filter in the light source device in FIG. 2.

FIG. 4 is a graph of a reflection property of a second filter 60. When the red laser light having a peak intensity of 640 nm, which is emitted from the red laser light source 20, is used, the reflectivity of the second filter 60 is preferably set to 96% or more in a range of 620 nm to 660 nm as illustrated in FIG. 4.

Figure 5:
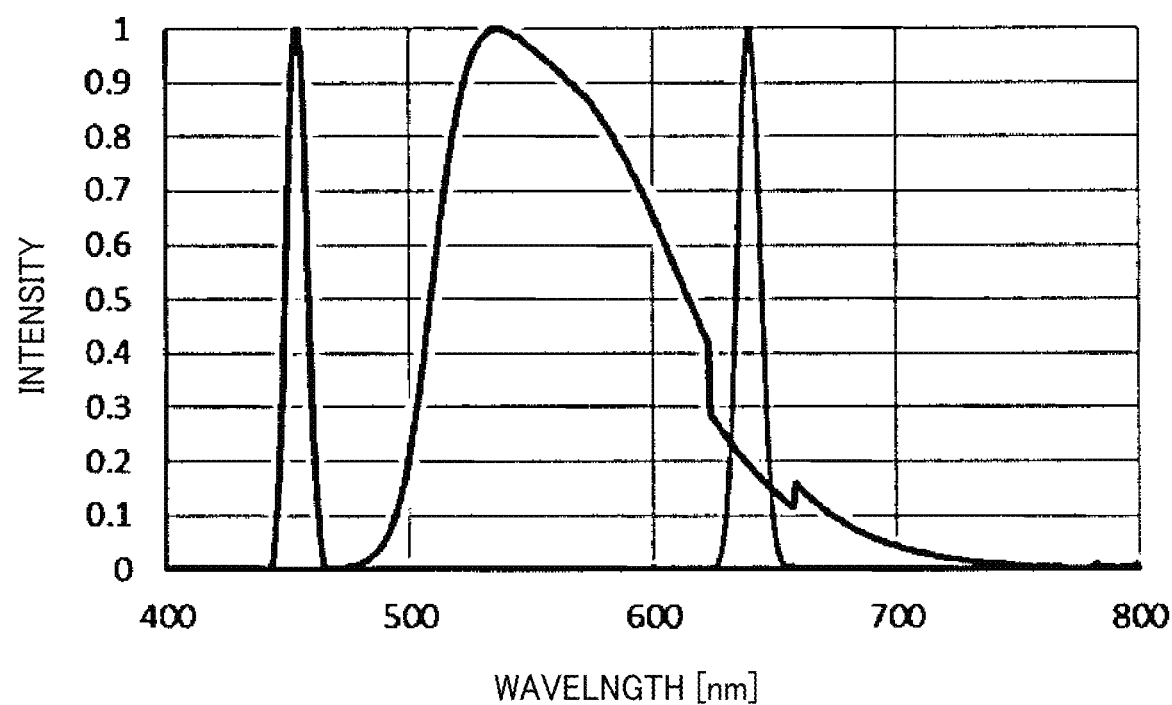
FIG. 5 is a graph of spectra of all light that enter a light homogenizing element used in the light source device in FIG. 2.

FIG. 5 is a graph of spectra of all the light that enters the light homogenizing element 100. In FIG. 5, the graph includes spectra of blue laser light, red laser light, and fluorescent light. Since a portion of the fluorescent light corresponding to the red laser light is transmitted through the second filter 60, the light use efficiency is reduced. However, the reduction in the light use efficiency is lowered by optimally setting the reflection properties, size, and arrangement of the second filter 60.

An amount of red laser light (i.e., second color light) reflected by the second filter 60 is larger than an amount of fluorescent light (i.e., third color light) reflected by the second filter 60. A color reproducibility is improved while maintaining brightness by increasing a component of the red laser light more than loss of the fluorescent light in the second filter 60.

Figure 6A:
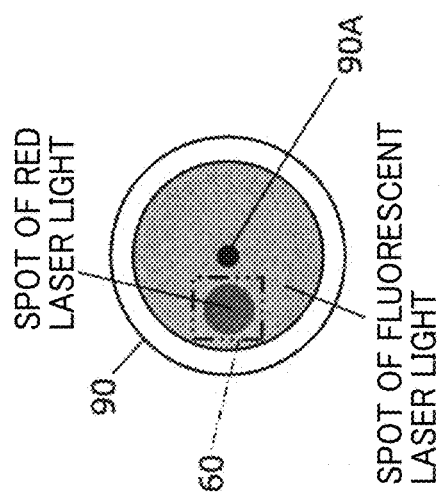
FIG. 6A is an illustration of spots of red laser light and fluorescent light on a second condensing lens in an overlapping manner with a second filter used in the light source device in FIG. 2.
Figure 6B:
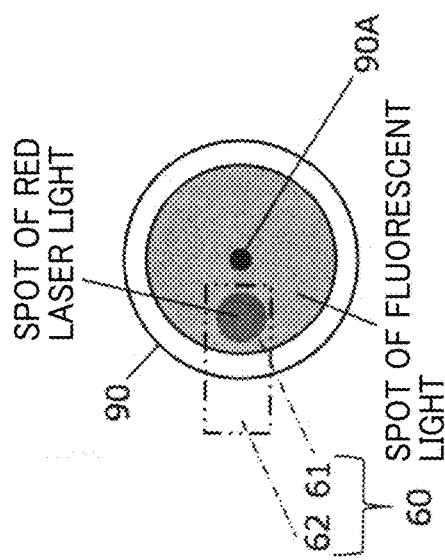
FIG. 6B is another illustration of spots of red laser light and fluorescent light on a second condensing lens in an overlapping manner with a second filter used in the light source device in FIG. 2.
Figure 6C:
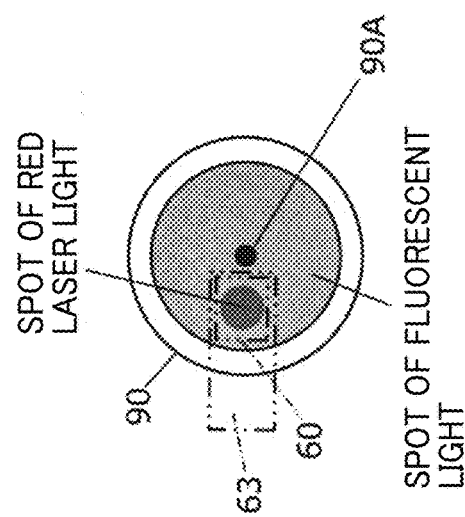
FIG. 6C is still another illustration of spots of red laser light and fluorescent light on a second condensing lens in an overlapping manner with a second filter used in the light source device in FIG. 2.

FIGS. 6A to 6C are illustrations of spots of the red laser light and the fluorescent light on the second condensing lens 90, which are overlapped with the second filter 60. FIGS. 6A to 6C are illustrations of a positional relation among the second filter 60, the second condensing lens 90, the optical axis 900, the spot of the red laser light, and the spot of the fluorescent light as viewed from the negative side in the Y-axis.

In FIGS. 6A to 6C, the optical axis 90A of the second condensing lens 90 is a virtual straight line that coincides with a rotational axis of the second condensing lens 90 (i.e., the second condensing lens has a rotational symmetry). A spot of the fluorescent light on the second condensing lens 90 is formed on a wider range over a substantially entire area of an effective optical surface around the optical axis 90A of the second condensing lens 90. By contrast, the spot of the red laser light on the second condensing lens 90 is located on the left side of the optical axis 90A of the second condensing lens 90 and is within a range of a reflecting surface of the second filter 60 depicted by a dashed-two dotted line.

According to the configuration described above, in which the spot of the red laser light in the second condensing lens 90 smaller than the spot of the fluorescent light in the second condensing lens 90, the light use efficiency of the fluorescent light is improved.

Preferably, the light source device satisfies a conditional expression (1) below: (1) $0.100 \leq PSA2/PSA3 \leq 0.375$ where PSA2 is a projection area of the fluorescent light (i.e., third color light) on the second condensing lens 90 (i.e., second light condensing element) and PSA3 is a projection area of the red laser light (i.e., second color light) on the second condensing lens 90 (i.e., second light condensing element)

When the conditional expression (1) is satisfied, a beam size of the red light and a size of the second filter 60 are reduced, so that the cost of the second filter is reduced. In addition, the light use efficiency of the fluorescent light is improved, and a color unevenness of the red light is prevented. If a ratio of PSA2/PSA3 is larger than 0.375 in the conditional expression (1), a beam size of the red light becomes larger and the second filter also becomes larger, so that the cost of the second filter becomes higher. In addition, the light use efficiency of the fluorescent light is significantly reduced. If the ration of PSA2/PSA3 is less than 0.100 in the conditional expression (1), a color unevenness of the red light occurs, because the beam size of the red laser light is narrowed.

In FIG. 6A, the entire region of the second filter 60 contributes to reflection of the red laser light. In FIG. 6B, the second filter 60 is held outside of the spot of the fluorescent light, and the second filter 60 is extended to the outside of the spot of the fluorescent light, which is the left side in the drawing. A portion of the second filter 60 that overlaps with the spot of the fluorescent light is used as a reflection portion 61, and another portion of the second filter 60 that does not overlap with the spot of the fluorescent material is used as a non refection portion 62. The second filter 60 illustrated in FIG. 6.13 is an example of the second filter as a single member, in FIG. 6C, the second filter 60 is partially formed on a glass substrate 63 as a separate member. The glass substrate 63 is extended to the outside of the spot of the fluorescent light, which is the left side in FIG. 6C. A portion of the glass substrate 63 on which the second filter 60 is not formed is a non-reflection portion and a non-filter formation portion. A configuration illustrated in FIG. 6C is an example using multiple members including the second filter 60 and the glass substrate 63.

The fluorescent light in the light source device in FIG. 2 has a larger amount of light in the vicinity of the optical axis 90A of the second condensing lens 90 (i.e., second condensing element). Thus, the second condensing lens 90 is arranged so that the spot of the red laser light does not overlap with the optical axis 90A of the second condensing lens 90. In other words, the second filter 60 is arranged not to overlap with the optical axis 90A of the second condensing lens 90, so that decrease in the light use efficiency of the fluorescent light is restricted.

Second Embodiment

Figure 7:
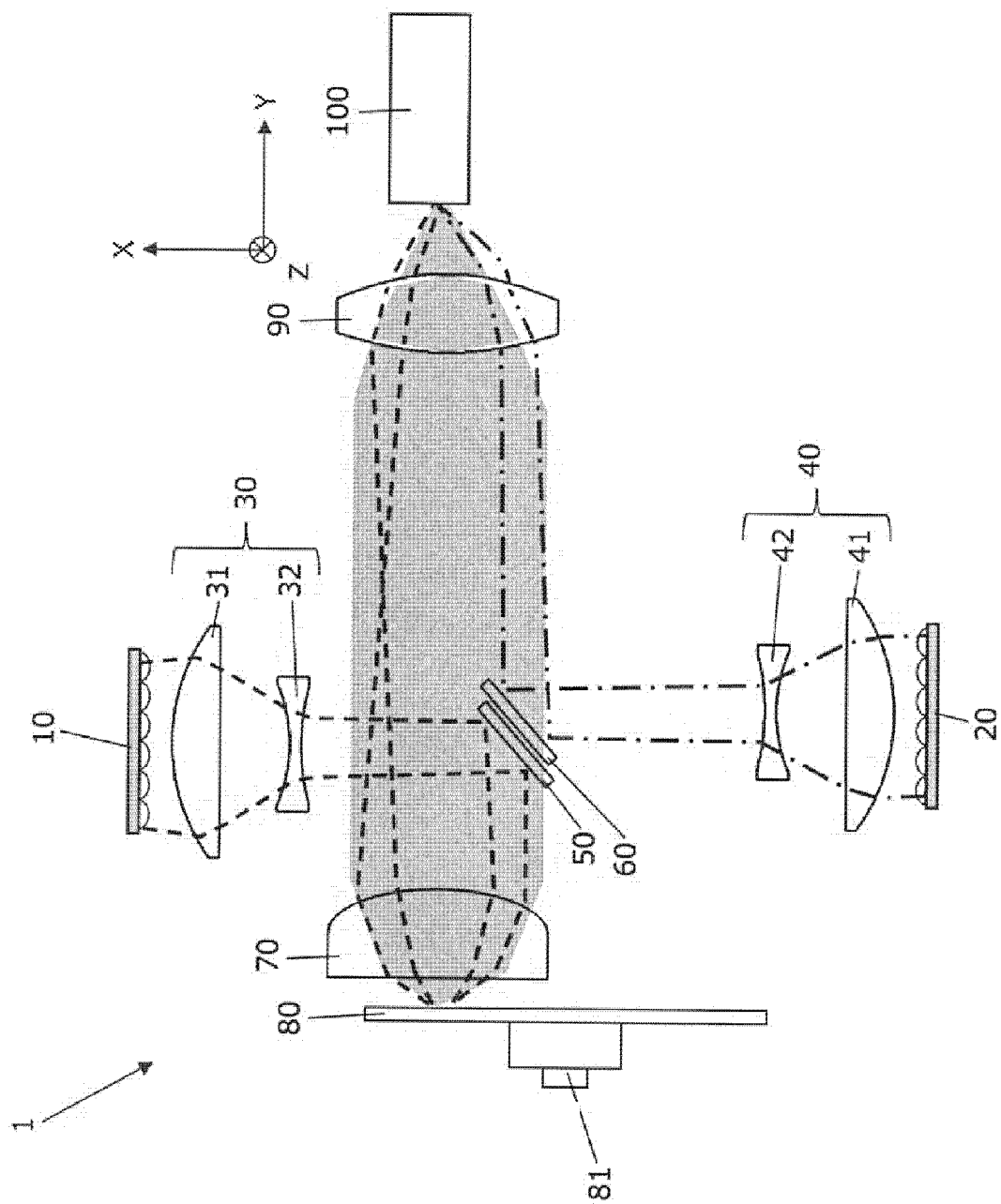
FIG. 7 is an illustration of a configuration of a light source device according to a second embodiment used.

A light source device 1 according to a second embodiment is described with reference to FIGS. 7 and 8. FIG. 7 is an illustration of a configuration of the light source device 1 according to the second embodiment. FIGS. 8A and 8B are illustrations of the arrangement of the first filter 50 and the second filter 60. Descriptions of overlapping portions with the light source device 1 according to the first embodiment are omitted.

In the light source device 1 according to the second embodiment, a position of a set including the blue laser light source 10, the blue laser reduction element 30, and the first filter 50, and a position of a set including the red laser light source 20, the red laser reduction element 40, and the second filter 60 coincide in the Y-axis and are arranged in the X-axis. The set including the blue laser light source 10, the blue laser reduction element 30 and the first filter 50 is arranged at the positive side in the X-axis, and the set including the red laser light source 20, the red laser reduction element 40, and the second filter 60 is arranged at the negative side in the X-axis. The first filter 50 and the second filter 60 are disposed with back sides of the reflecting surfaces thereof facing each other (FIGS. 8A and 8B).

As described in FIG. 7, since the first filter 50 and the second filter 60 are arranged to overlap a portion of the optical path of the fluorescent light (i.e., third color light) between the wavelength conversion unit 80 and the light homogenizing element 100, a portion not passing through the first filter 50 and the second filter 60 is increased on the optical path of the fluorescent light. As a result, the utilization efficiency of the fluorescent light is improved.

Figure 8B:
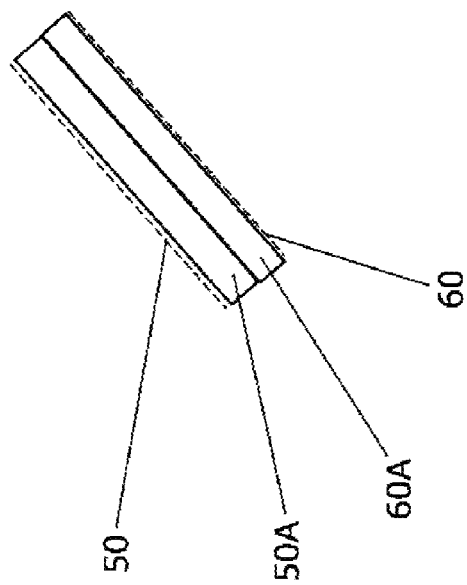
FIG. 8B is an illustration of another configuration of a first filter and a second filter used in the second embodiment in FIG. 7.
Figure 8A:
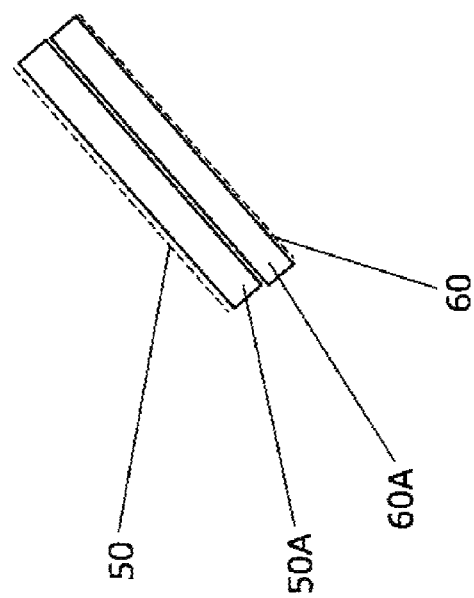
FIG. 8A is an illustration of a configuration of a first filter and a second filter used in the second embodiment in FIG. 7.

As illustrated in FIGS. 8A and 8B, the first filter 50 is formed on a surface of the substrate 50A such as glass, and the second filter 60 is formed on a surface of the substrate 60A such as glass. In FIG. 8A, a back surface of the substrate 50A on which the first filter 50 is not formed and a back surface of the substrate 60A on which the second filter 60 is not formed are opposed to each other with a gap therebetween. In FIG. 8B, a back surface of the substrate 50A on which the first filter 50 is not formed and a back surface of the substrate 60A on which the second filter 60 is not formed are bonded to each other. In an arrangement of the first filter 50 and the second filter 60 in FIG. 8B, a light loss at an interface between the substrate SPA and the substrates 60A is reduced, and a decrease in the light use efficiency of the fluorescent light is reduced.

Third Embodiment

Figure 9:
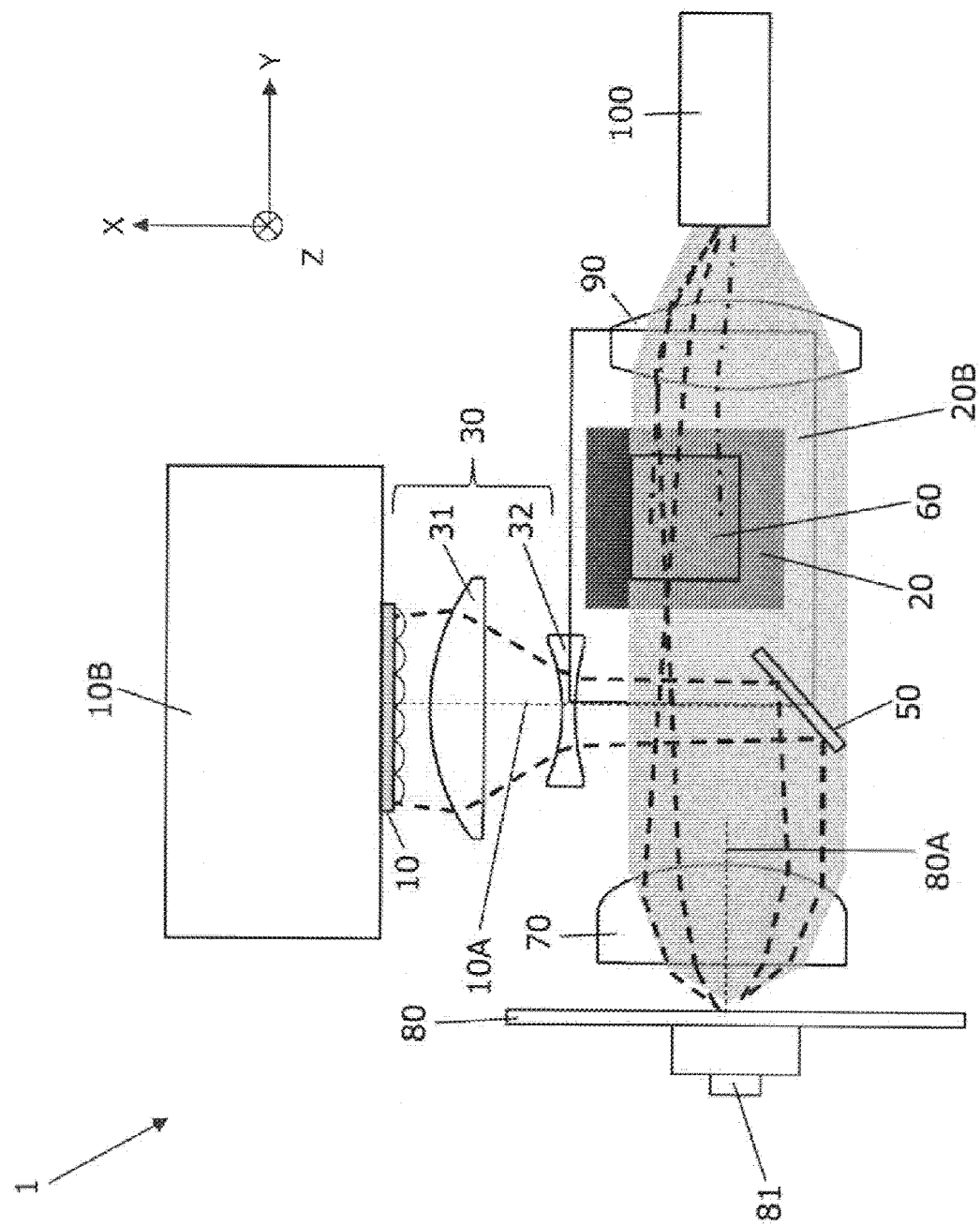
FIG. 9 is an illustration of a configuration of a light source device according to a third embodiment as viewed from a negative side in a Z-axis.
Figure 10:
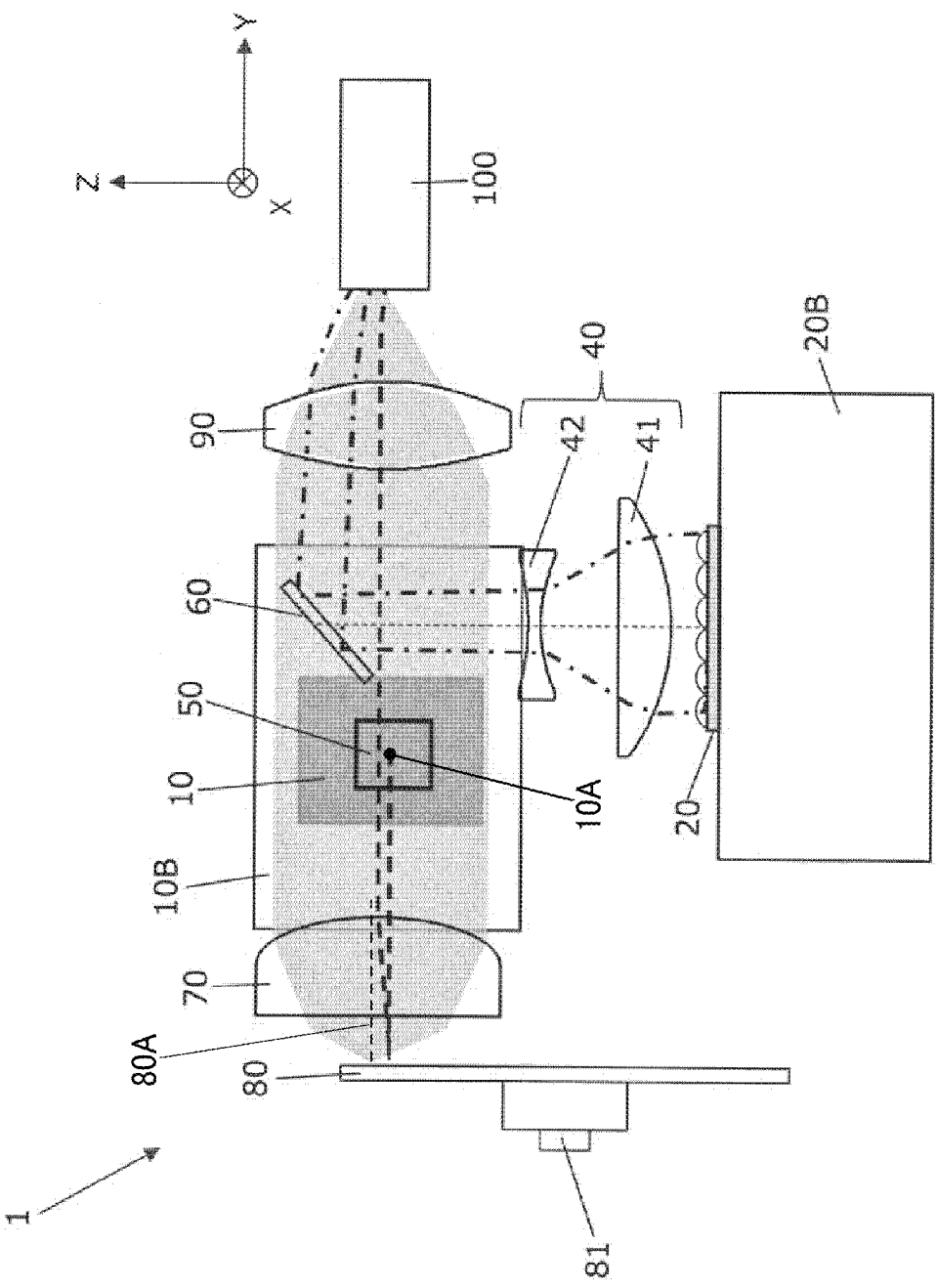
FIG. 10 is an illustration of a configuration of a light source device according to a third embodiment in FIG. 9 as viewed from a negative side in an X-axis.

A light source device 1 according to a third embodiment is described with reference to FIGS. 9 and 10. FIGS. 9 and 10 are illustrations of a configuration of the light source device 1 according to the third embodiment. FIG. 9 is an illustration of a configuration of the light source device according to the third embodiment as viewed from the negative side of the Z-axis (i.e., in the −Z-direction). FIG. 10 is an illustration of the configuration of the light source device according to the third embodiment as viewed in the −X-direction. Overlapping portions of the description on the light source device 1 of the first and second embodiments are omitted.

In the light source device 1 according to the third embodiment, the optical axis of the blue laser light (i.e., first color light), the optical axis of the red laser light (i.e., second color light), and the optical axis of the fluorescent light (i.e., third color light) are not on the same plane and arranged in three dimensions. The optical axis 10A (i.e., center axis) of the first color light emitted from the blue laser light source 10 (i.e., first light source) and the optical axis 20A (i.e., center axis) of the second color light emitted from the red laser light source 20 (i.e., second light source) are neither parallel to nor intersecting with each other in the optical path of the third color light between the wavelength conversion unit 80 and the light homogenizing element 100 (i.e., light incident element). In other words, the optical axis 10A (i.e., center axis) and the optical axis 20A (i.e., center axis) form skew lines in the optical path of the third color light. As shown in FIGS. 9 and 10, the optical axis 10A of first color light (blue laser light) emitted directly from the blue laser light source 10 is located on a first plane and an optical axis of second color light (red laser light) emitted directly from the second light source 20 is located on a second plane perpendicular to the first plane in three-dimensional coordinate system.

Specifically, the light source device 1 according to the third embodiment corresponds to the light source device 1 according to the first embodiment in which a set including the red laser light source 20, the red laser reduction element 40, and the second filter 60 is rotated by 90° around an rotation axis parallel to the Y-axis.

In the light source device 1 according to the third embodiment, a blue laser heat sink 10B is provided on a back surface of the blue laser light source 10, and a red laser heat sink 20B is provided on a back surface of the red laser light source 20. The blue laser heat sink 10B and the red laser heat sink 20B may also be provided in the light source device 1 according to the first embodiment.

In the light source device 1 according to the third embodiment, since the blue laser light source 10 (i.e., the blue laser light) and the red laser light source 20 (i.e., the red laser light) are arranged in three dimensions, a latitude of arrangement of the light sources is further increased, and the entire optical system is reduced in size.

In the light source device 1 according to the third embodiment, the optical axis of the red laser light source 20 is rotated by 90° with respect to the optical axis of the blue laser light source 10, and the second filter 60 is also rotated by 90° accordingly. With this configuration, the light source device is reduced in size in the X-axis. In an arrangement of the wavelength conversion unit 80 in the light source device in FIG. 10, there is a space along the Z-axis due to the existence of the wavelength conversion unit 80. When the red laser light source 20 is disposed in the space, the red laser light source does not protrude from the end of the wavelength conversion unit 80. As a result, the configuration of the light source device 1 is preferable (Such an arrangement provides a desired compact laser light source).

In the light source device 1 according to the third embodiment, the optical axis of the red laser light source 20 is rotated by 90° with respect to the optical axis of the blue laser light source 10. However, the rotation angle is not limited to 90° and may be any angle, which depends on, for example, a design of a cooling device (e.g., heat sink).

Fourth Embodiment

Figure 11:
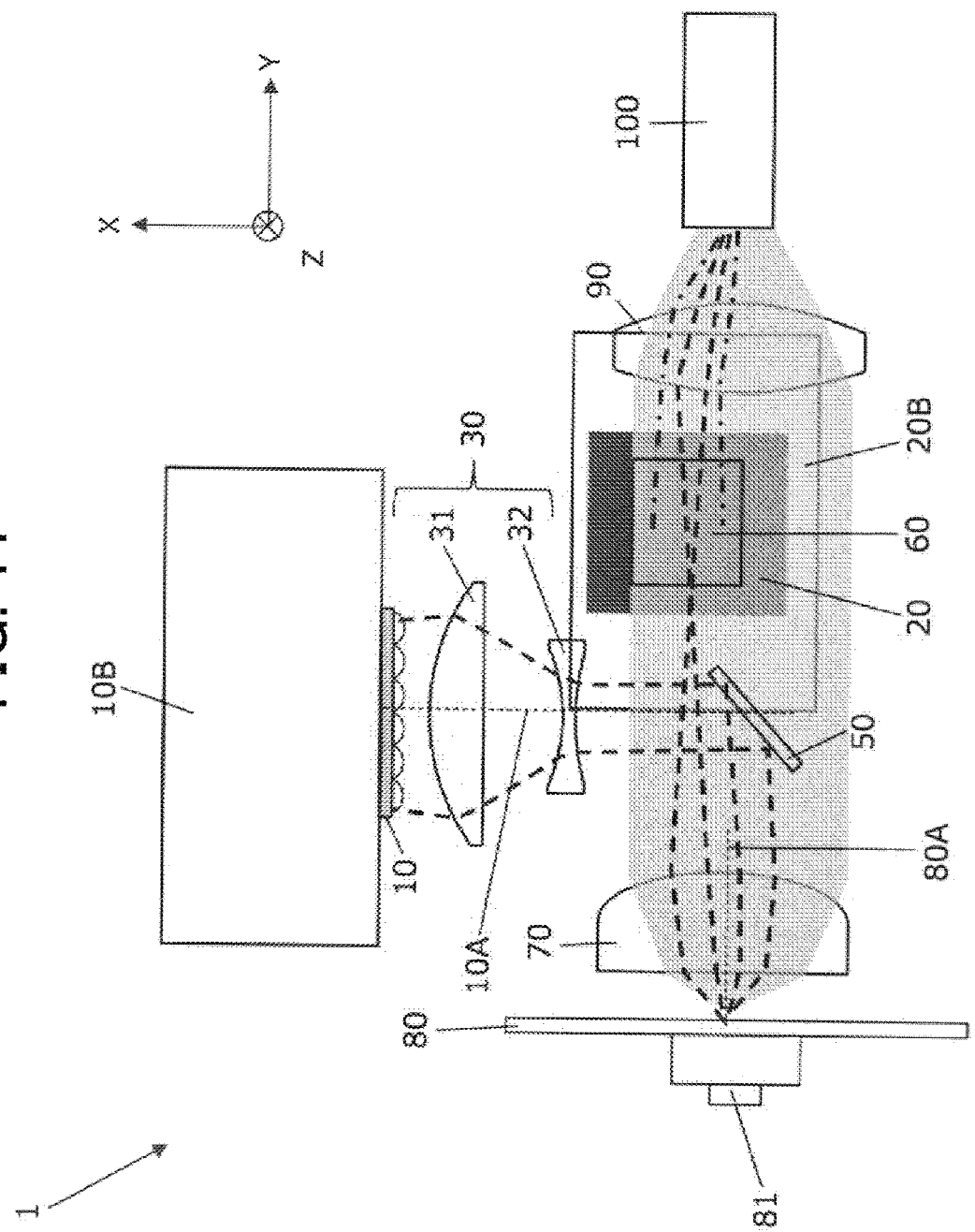
FIG. 11 is an illustration of a configuration of a light source device according to a fourth embodiment as viewed from a negative side in a Z-axis.
Figure 12:
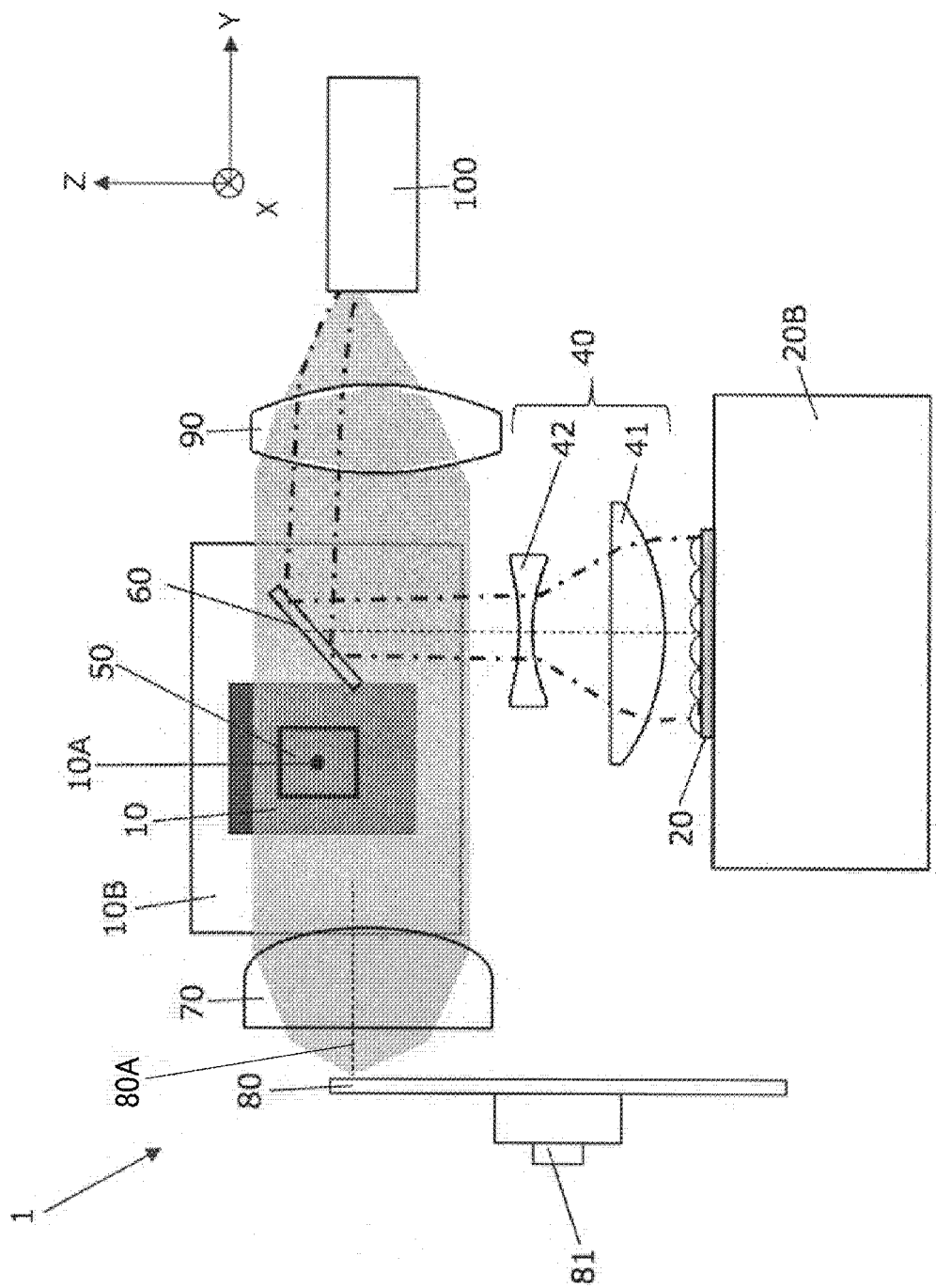
FIG. 12 is an illustration of a configuration of a light source device according to a fourth embodiment in FIG. 11 as viewed from a negative side in an X-axis.

A light source device 1 according to a fourth embodiment is described with reference to FIGS. 11 and 12. FIGS. 11 and 12 are illustrations of a configuration of the light source device 1 according to the fourth embodiment. FIG. 11 is an illustration of aa configuration of the light source device 1 as viewed in the −Z-axis, and FIG. 12 is an illustration of the configuration of the light source device 1 as viewed in the −X-axis. Descriptions of overlapping portions with the light source device 1 according to the first to third embodiments are omitted.

The light source device 1 according to the fourth embodiment corresponds to the light source device 1 according to the first embodiment in which a position of the optical axis 10A (i.e., central axis) of the blue laser light (i.e., first color light) and a position of the optical axis 80A (i.e., central axis) of the fluorescent light (i.e., third color light) are shifted in the Z-axis. A shift between the optical axis 10A and the optical axis 80A in the Z-axis in FIG. 12 is different from than in FIG. 12. As described above, since the optical axis of the blue laser light, the optical axis of the red laser light, and the optical axis of the fluorescent light are arranged in three dimensions preferably, a latitude of an arrangement of the light sources is increased and the size of the light source device is entirely reduced.

Fifth Embodiment

Figure 13:
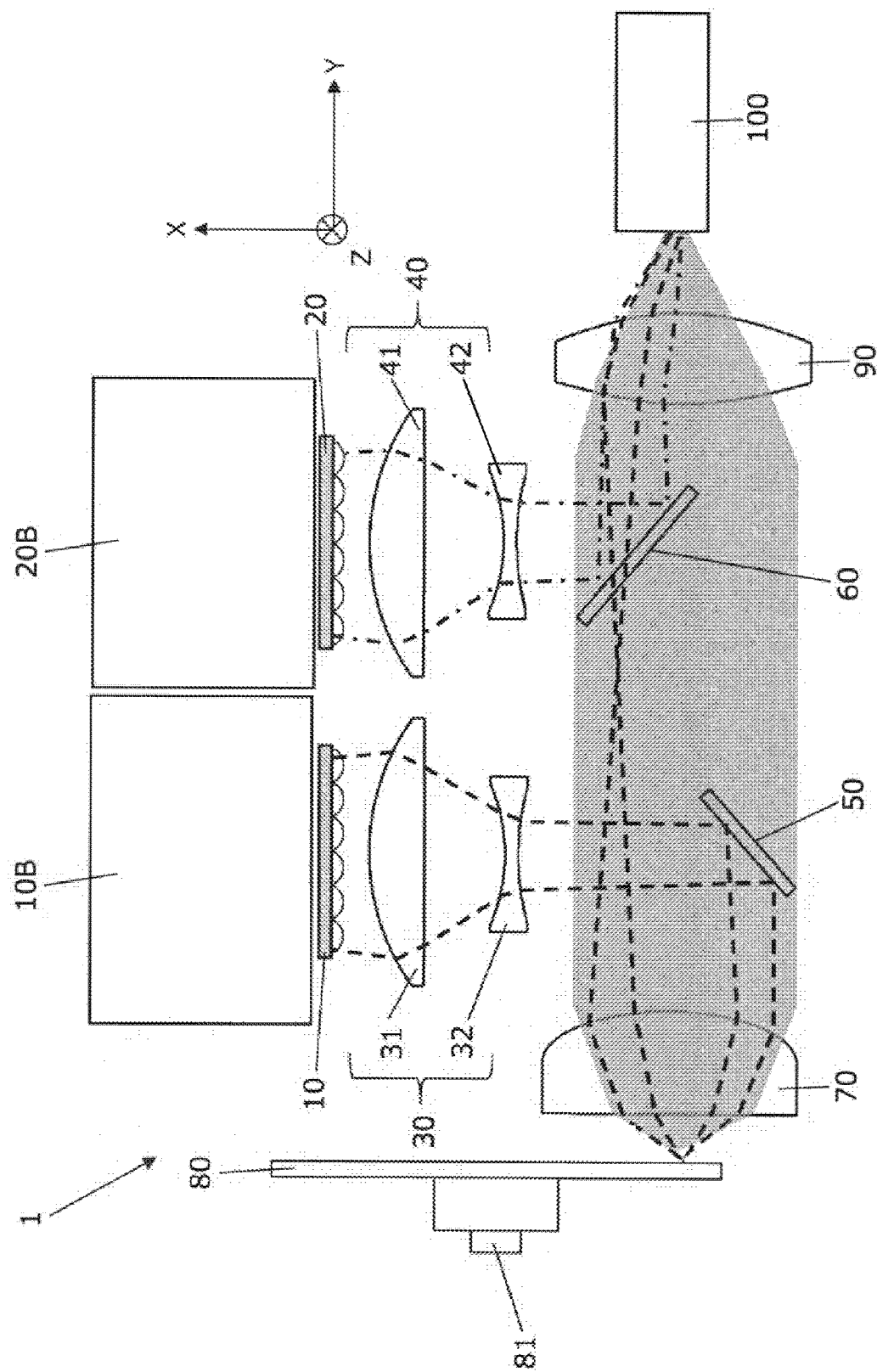
FIG. 13 is an illustration of a configuration of a light source device according to a fifth embodiment.

A light source device 1 according to a fifth embodiment is described with reference to FIG. 13. FIG. 13 is an illustration of a configuration of the light source device 1 according to the fifth embodiment.

In the light source device 1 according to the fifth embodiment, the positions of a set including the blue laser light source 10, the blue laser reduction element 30, and the first filter 50, and a position of a set including the red laser light source 20, the red laser reduction element 40, and the second filter 60 coincide with each other in the X-axis and are arranged in the Y-axis. An arrangement order of the blue laser light source 10, the blue laser reduction element 30, and the first filter 50 and an arrangement order of the red laser light source 20, the red laser reduction element 40, and the second filter 60 are from the positive side to the negative side in the X-axis. The set including the blue laser light source 10, the blue laser reduction element 30, and the first filter 50, and the set including the red laser light source 20, the red laser reduction element 40, and the second filter 60 are arranged substantially in parallel. In the light source device 1 of the fifth embodiment, a cooling air flow used in at least one of the blue laser heat sink 10B for the blue laser and the red laser heat sink 20B for the red laser is also used to cool the other heat sink, thereby improving the efficiency of cooling and reduction the number of, fans, thereby reducing the size and cost of the device.

The light source device 1 according, to the first to fifth embodiments has been described as an example. Modifications of the light source device 1 in the case where the first filter 50 and the second filter 60 are separately disposed on the optical path (gray scale) of the fluorescent light (i.e., third color light) between the wavelength conversion unit 80 and the light homogenizing element 100 are conceivable other than the light source device 1 according to the first to fifth embodiments, and various design changes are possible. In any of the embodiments, the light source device is prevented from increasing in size in one direction by shifting a position of the laser light source, and the light source device is disposed with high cooling efficiency. A size of a heat sink is also reduced, and the size and weight of the laser light source are reduced.

Comparative Example

Figure 14:
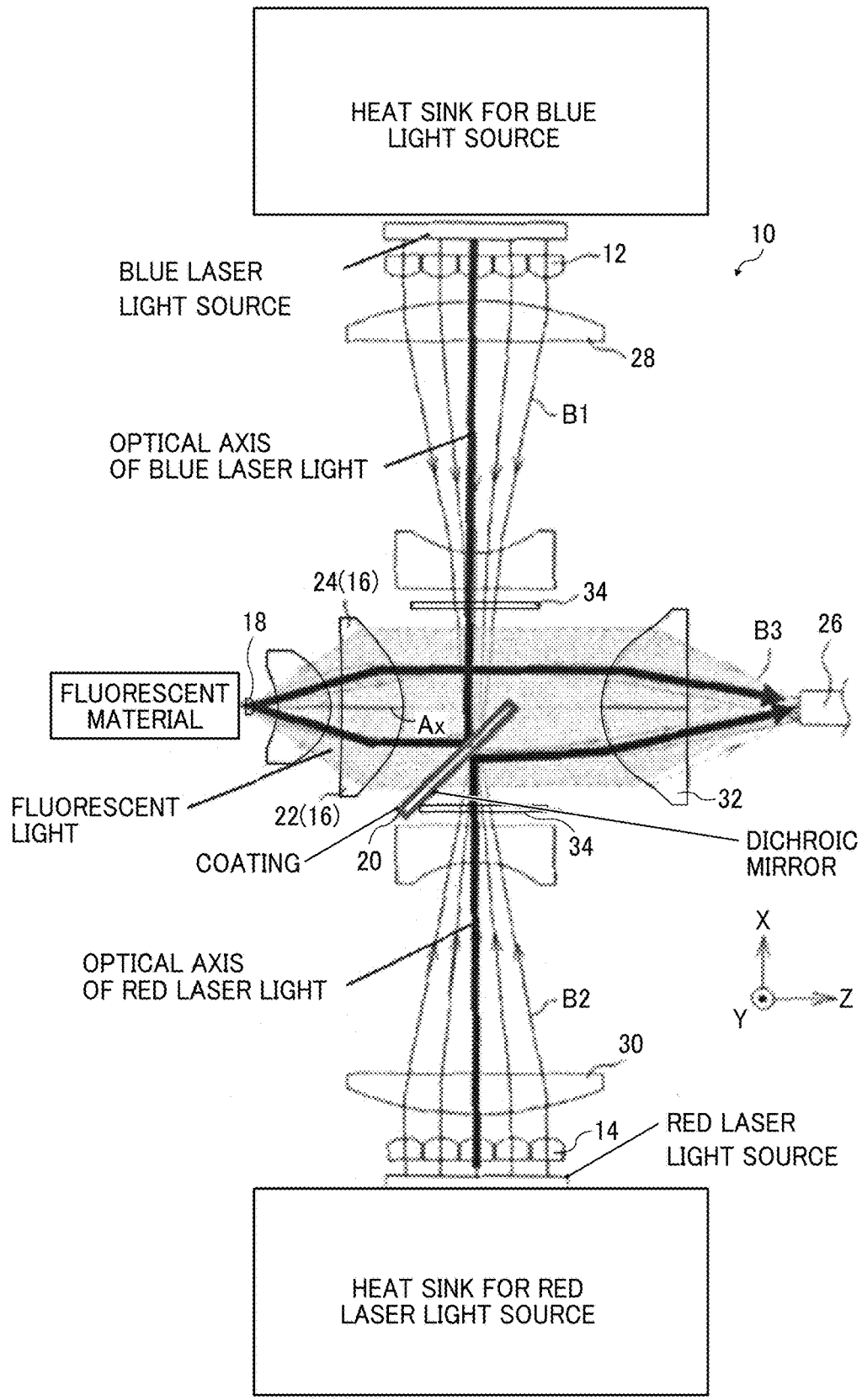
FIG. 14 is an illustration of a configuration of a light source device as a comparative example.

FIG. 14 is an illustration of a configuration of a light source device as a comparative example.

In the light source device as the comparative example, a dichroic mirror is disposed between a blue laser light source and a red laser light source and the blue laser light source, the dichroic mirror, and the red laser light source are aligned in this order from the negative side to the positive side in the X-axis in FIG. 14. An optical axis of the blue laser and the optical axis of the red laser coincide with each other through the dichroic mirror (i.e., linear arrangement). Because of the linear arrangement, the light source device itself becomes larger in the X-axis in FIG. 14. In addition, since a heat sink for the blue laser light source and a heat sink for the red laser light source are attached on back surfaces of the blue laser light source and the red laser light source, the light source device itself becomes larger in the X-axis in FIG. 14.

Since the blue laser and the red laser are reflected by a single dichroic mirror, a size of the dichroic mirror is increased. Further, a width of the dichroic mirror occupying to a width of a beam of the fluorescent light is wider. A light use efficiency may decrease due to blocking, (i.e., vignetting) oldie fluorescent light from the phosphor by the dichroic mirror. Since the blue laser and the red laser are reflected by a single dichroic mirror, a reflectance spectrum becomes wider, and the amount of the fluorescent light reflected by the single dichroic mirror becomes larger. As a result, the light use efficiency may decrease. Since the blue laser and the red laser are reflected by a single dichroic mirror, a property, a size, and an arrangement of a filter of the dichroic mirror is hard to change. Thus, the light use efficiency of the fluorescent light is also reduced.

In the light source device of the comparative example, there is a large limitation on the arrangement of the blue laser light source and the red laser light source. A configuration in which the entire light source device is well accommodated is hard to achieve. Further, if there is a limitation on the arrangement of the light sources, it is difficult to achieve an arrangement with good cooling efficiency, and the heat sink becomes large and heavy.

In the light source device of the comparative example, one or two filters (i.e., coatings applied to a dichroic mirror) are provided on one side of the fluorescent light. Although a blue reflection filter and a red reflection filter transmit the fluorescent light, since the transmittance of the dichroic mirror is typically about 96%, the light use efficiency on one side of the optical path of the fluorescent light falls to about 93% at the maximum, which may cause color unevenness in the optical path of the fluorescent light.

Figure 15:
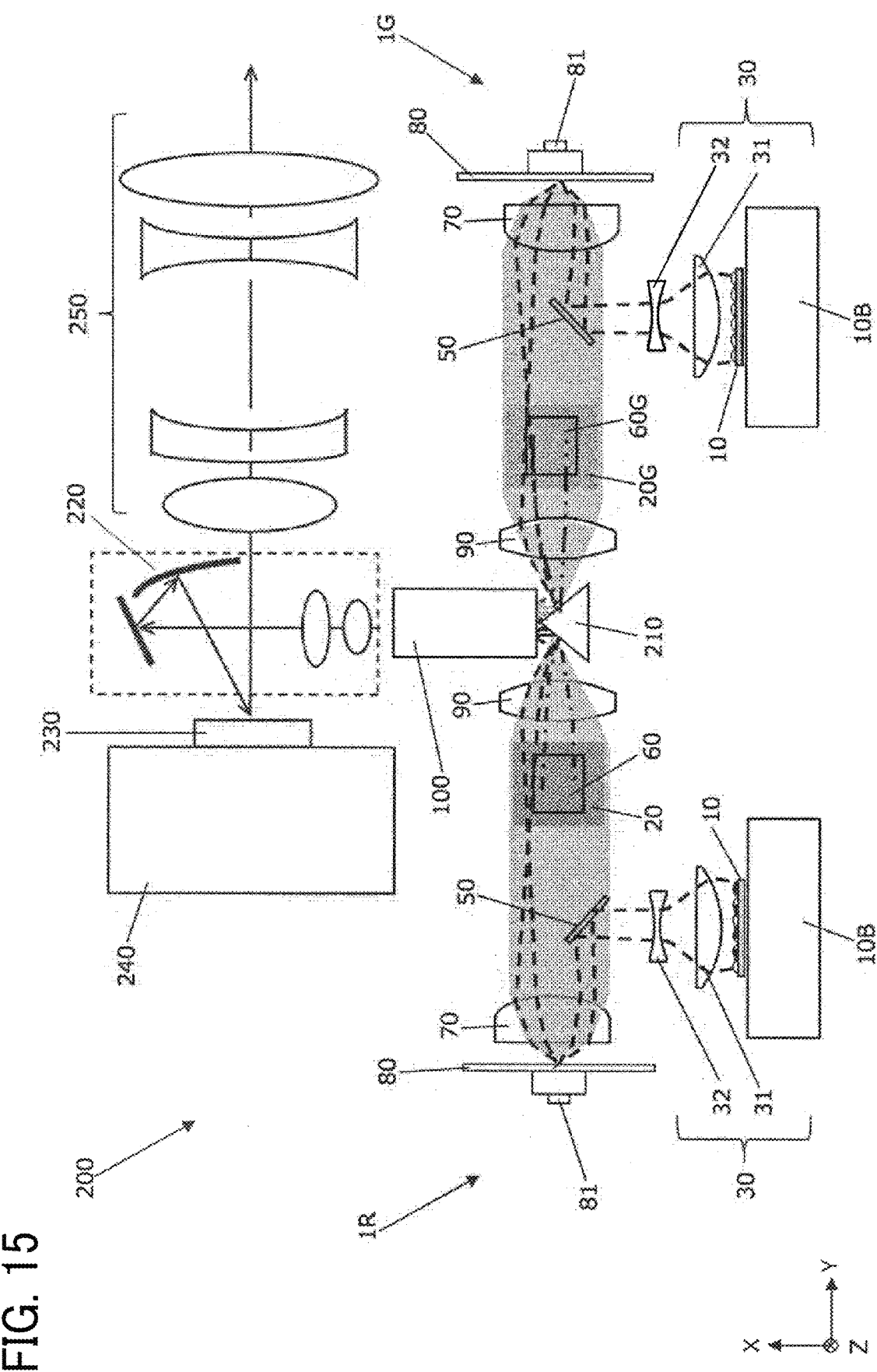
FIG. 15 is an illustration of a configuration of a projector according to the present embodiment.

Projector (image projection apparatus) FIG. 15 is an illustration of a configuration of a projector 200 (i.e., image projection apparatus) according to the present embodiment. As illustrated in FIG. 15, the projector 200 includes a light source device 1R including a blue laser light source 10 and a red laser light source 20 and a light source device 1G including a blue laser light source 10 and a green laser light source 20G. The light homogenising element 100 is shared by the light source device 1R and the light source device 1G.

In the light source device 1R, blue laser light emitted from the blue laser light source 10 is reflected by the first filter 50 and separated into blue laser light and fluorescent light by the wavelength conversion unit 80. The red laser light emitted from the red laser light source 20 is reflected by the second filter 60. In FIG. 15, a beam of the blue laser light is depicted by a broken line, abeam of the red laser light is depicted by a dashed-dotted line, and a beam of the fluorescent light is depicted by halftone.

In the light source device 1G, blue laser light emitted from the blue laser light source 10 is reflected by the first filter 50 and separated into blue laser light and fluorescent light by the wavelength conversion unit 80. The green laser light emitted from the green laser light source 20G (i.e., second light source) is reflected by the second filter 60G (i.e., second optical element, second dichroic mirror, or second notch filter). In FIG. 15, a beam of the blue laser light is drawn depicted by a broken line, a beam of the green laser light is depicted by a dashed-dotted line, and a beam of the fluorescent light is depicted by halftone.

The blue laser light, the red laser light, and the fluorescent light from the light source device 1R and the blue laser light, the green laser light, and the fluorescent light from the light source device 1G are combined by an optical path combining element 210 having two mirrors, and are guided to the light homogenizing element 100.

The projector 200 includes an illumination optical system 220, an image display element 230, a cooling device 240 (e.g., heat sink), and a projection optical system 250.

The illumination optical system 220 guides light emitted from the light source devices 1R and 1G to the image display element 230 through the light homogenizing element 100. The image display element 230 modulates the light guided by the illumination optical system 220 and generates and outputs an image. The cooling device 240 cools the image display element 230. The projection optical system 250 protects the image generated by the image display element 230 using the light guided through the illumination optical system 220. In other words, the projection optical system enlarges light emitted from the image display element 230 and projects the enlarged light onto a screen.

According to the projector of the embodiment, since the red laser light and the green laser light are combined with the fluorescent light while preventing the light use efficiency of the fluorescent light from decreasing, both brightness and a color reproducibility are maintained. Further, since the size of the projector is determined in consideration of the arrangement of the optical system other than the light source device and the cooling device, the size of the projector is reduced in combination with the advantage that the arrangement of the light sources is preferably determined.

As described above, in the light source device used in an image projection apparatus such as a projector according to the present embodiment, a reflection filter that guides multiple light beams emitted from multiple laser light sources is arranged for each laser light source to increase the latitude of arrangement of the laser light sources, and a reflection filter that reflects a wavelength band of each laser can be selected. In particular, by providing a reflection filter for each light source, a latitude of layout is increased, so that a thermal design (i.e., heat dissipation design of the light source) is facilitated, and the device is downsized.

Further, in the present embodiment, the dichroic mirrors (i.e., the first filter 50 and the second filter 60) are provided so as to be as small as possible with respect to the optical path of the fluorescent light and to avoid the optical axis 80A of the fluorescent light, in addition, the reflection spectrum of the dichroic mirror (i.e., second filter 60) corresponding to the red laser is narrowed. Further, the dichroic mirror (i.e., second filter 60) corresponding to the red laser is provided separately from the mirror (i.e., first filter 50) corresponding to the blue laser.

The light source device and the image projection device according to the present embodiment can be applied to, for example, a light source module mounted on a high-power projector using a laser light source, and can also be applied to other illumination light sources requiring high power.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A light source device comprising:
a first light source to emit first color light;
a second light configured to emit second color light;
a wavelength converter to convert at least a portion of the first color light into a third color light;
a light incident element to which the first color light, the second color light, and the third color light enter;
a first filter to reflect the first color light toward the wavelength converter; and
a second filter to reflect the second color light toward the light incident element,
wherein:
the first filter and the second filter separately disposed on an optical path of the third color light between the wavelength converter and the light incident element, and
an optical axis of first color light emitted directly from the first light source is located on a first plane and an optical axis of second color light emitted directly from the second light source is located on a second plane perpendicular to the first plane in three-dimensional coordinate system.

2. The light source device according to claim 1, wherein the second filter is further to transmit a portion of the third color light in a wavelength band excluding a wavelength band of the second color light.

3. The light source device according to claim 1, further comprising a light condensing optical system between the wavelength converter and the light incident element, wherein the second filter is disposed out of an optical axis of the light condensing optical system.

4. The light source device according to claim 1, wherein a center axis of the first color light emitted from the first light source and a center axis of the second color light emitted from the second light source do not coincide with each other.

5. The light source device according to claim 1, wherein the center axis of the first color light emitted from the first light source and the center axis of the second color light emitted from the second light source are on a same plane and parallel to each other in the optical path of the third color light between the wavelength converter and the light incident element.

6. The light source device according to claim 1, wherein the center axis of the first color light emitted from the first light source and the center axis of the second color light emitted from the second light source are neither parallel to nor intersecting with each other in the optical path of the third color light between the wavelength converter and the light incident element.

7. The light source device according to claim 1, wherein the center axis of the first color light, the center axis of the second color light, and an optical axis of the third color light are not on a same plane.

8. The light source device according to claim 1, wherein the second filter includes a non-filter forming portion that does not reflect the second color light.

9. The light source device according to claim 1, wherein an amount of the second color light reflected by the second filter is larger than an amount of the third color light reflected by the second filter.

10. The light source device according to claim 1, wherein the first color light is blue light, the second color light is red light or green light, and the third color light is fluorescent light of yellow or green.

11. The light source device according to claim 1, further comprising a first light condensing element between the first filter and the wavelength converter, the first light condensing element to condense the first color light reflected by the first filter and substantially collimate the first color light and the third color light emitted from the wavelength converter,
wherein the wavelength converter includes a reflection region to reflect the first color light,
wherein the first color light:

passes through a part of the first light condensing element;
enters the wavelength converter;
is reflected by the reflection region;
passes through another part of the first light condensing element to be emitted therefrom.

12. An image projection apparatus comprising:
the light source device according to claim 1;
an illumination optical system to guide light emitted from the light source device to an image display;
the image display to generate an image with the light guided by the illumination optical system; and
a projection optical system to project the image generated by the image display.

13. A light source device comprising:
a first light source to emit first color light;
a second light source to emit second color light;
a wavelength converter to convert at least a portion of the first color light into a third color light;
a light incident element to which the first color light, the second color light, and the third color light enter;
a first filter to reflect the first color light toward the wavelength converter; and
a second filter to reflect the second color light toward the light incident element,
the first filter and the second filter separately disposed on an optical path of the third color light between the wavelength converter and the light incident element,
the light source device further comprising a second light condensing element,
wherein the light source device satisfies a conditional expression (1) below:

$$0.100 \leq PSA2/PSA3 \leq 0.375 \tag{1}$$

where PSA2 is a projection area of the second color light on the second light condensing element and PSA3 is a projection area of the third color light on the second light condensing element.

14. A light source device comprising:
a first light source to emit first color light;
a second light source to emit second color light;
a wavelength converter to convert at least a portion of the first color light into a third color light;
a light incident element to which the first color light, the second color light, and the third color light enter;
a first filter to reflect the first color light toward the wavelength converter; and
a second filter to reflect the second color light toward the light incident element,
the first filter and the second filter separately disposed on an optical path of the third color light between the wavelength converter and the light incident element,
wherein the first filter and the second filter are arranged to prevent any portion of the third color light from passing through both the first filter and the second filter.

* * * * *